US007420158B2

United States Patent
Ohno et al.

(10) Patent No.: US 7,420,158 B2
(45) Date of Patent: Sep. 2, 2008

(54) SPREAD ILLUMINATING APPARATUS INCLUDING A HOUSING FRAME WITH AN OUTER FRAME MEMBER AND AN INNER FRAME MEMBER JOINTED TO A LIGHT CONDUCTOR PLATE

(75) Inventors: Yasuo Ohno, Kitasaku-gun (JP); Katsumi Nagata, Kitasaku-gun (JP); Masahisa Nishio, Kitasaku-gun (JP); Chiharu Ota, Kitasaku-gun (JP)

(73) Assignee: Minebea Co., Ltd., Kitasaku-gun (JP)

( * ) Notice: Subject to any disclaimer, the term of this patent is extended or adjusted under 35 U.S.C. 154(b) by 0 days.

(21) Appl. No.: 11/797,604

(22) Filed: May 4, 2007

(65) Prior Publication Data

US 2007/0267564 A1    Nov. 22, 2007

(30) Foreign Application Priority Data

May 18, 2006   (JP)   .............................. 2006-138897

(51) Int. Cl.
*H01J 5/02*   (2006.01)

(52) U.S. Cl. ...................... 250/239; 250/216

(58) Field of Classification Search .................. 250/239, 250/216, 221, 227.11, 227.22; 362/367, 362/561, 620, 616, 26; 349/65, 150–153, 349/190; 345/5, 6, 31, 87, 100, 102
See application file for complete search history.

(56) References Cited

U.S. PATENT DOCUMENTS 6,342,932 B1 *   1/2002   Terao et al. ................... 349/58
6,538,710 B1     3/2003   Jang
2003/0164903 A1  9/2003   Saito et al.

FOREIGN PATENT DOCUMENTS

| JP | A 2002-156632 | 5/2002 |
| JP | A-2003-215546 | 7/2003 |
| JP | A-2004-186004 | 7/2004 |

* cited by examiner

*Primary Examiner*—Que T Le
(74) *Attorney, Agent, or Firm*—Oliff & Berridge, PLC

(57) ABSTRACT

In a spread illuminating apparatus, at least one point light source is disposed at an end wall of an outer frame member, and a subassembly is constituted by a light conductor plate and an inner frame member via first joint means. The subassembly has interface surfaces to make contact with the end wall of the outer frame member, a light inlet face of the light conductor plate is positioned to recede from the interface surface by a predetermined dimension, the first joint means each includes a elastic member to press the light conductor plate toward the interface surfaces, and the subassembly is jointed to the outer frame member via second joint means each constituted by an elastic member to press the interface surfaces toward the end wall of the outer frame member.

11 Claims, 3 Drawing Sheets

SPREAD ILLUMINATING APPARATUS INCLUDING A HOUSING FRAME WITH AN OUTER FRAME MEMBER AND AN INNER FRAME MEMBER JOINTED TO A LIGHT CONDUCTOR PLATE

BACKGROUND OF THE INVENTION

1. Field of the Invention

The present invention relates to a side light type spread illuminating apparatus, and particularly to a spread illuminating apparatus for use as a lighting means for a liquid crystal display device.

2. Description of the Related Art

A side light type spread illuminating apparatus, in which a primary light source is disposed at a side surface of a light conductor plate, is predominantly used as a lighting means for a liquid crystal display (LCD) device used in a mobile telephone, and like devices. Conventionally, the primary light source has been constituted by a cold cathode lamp. Currently, a point light source, such as a while light emitting diode (LED), which is easier to handle, enables easier downsizing, and is more resistant to impact shock than the cold cathode lamp, is heavily used.

Such a spread illuminating apparatus using a point light source currently for use with a small LCD device for a mobile telephone is expanding its application area, and application in a relatively large LCD device for, for example, a car navigation system is now considered. In order to sufficiently illuminate a large area, various approaches have been attempted to efficiently utilize light emitted from the primary light source and also to increase the amount of the light emitted.

One of such approaches is disclosed (refer to, for example, Japanese Patent Application Laid-Open No. 2003-215546: Paragraph [0027] and FIG. 2 therein), in which an LED is disposed tightly close to a light conductor plate so that light emitted from the LED can be efficiently introduced into the light conductor plate. FIG. 4 shows a conventional spread illuminating apparatus incorporating the aforementioned approach. In the spread illuminating apparatus shown, a light inlet surface LP of a light conductor plate GLB makes contact with the light emitting portions of LEDs 1 and 2, and projections PJ1 and PJ2 are formed at the inner face of one side LW2 of a frame-like molded case MLD so as to protrude toward the LEDs 1 and 2 thereby generating a force (F) to press the light conductor plate GLB against the LEDs 1 and 2, which ensures a close contact between the LEDs 1 and 2 and the light inlet surface LP of the light conductor plate GLB thus allowing lights emitted from the LEDs 1 and 2 to be effectively introduced into the light conductor plate GLB.

Another approach is to increase the amount of light emitted from a primary light source by increasing the number of LEDs disposed at a side of a light conductor plate, or by increasing the current applied to an LED. This approach, however, causes an increase in heat generation at the primary light source thus raising the ambient temperature.

Generally, the luminous efficiency of an LED is lowered with an increase in temperature, and also in the case of the spread illuminating apparatus of FIG. 4 in which the LED and the light inlet surface of the light conductor plate are in contact with each other, heat generated at the LED is transmitted directly to the light inlet surface of the light conductor plate thus increasingly possibly allowing the light inlet surface to suffer damages, such as heat deformation. To deal with the heat generation problem with the LED, the LED and the light conductor plate are housed in a metallic chassis such that the LED makes contact with the chassis for enhancing the radiation performance (refer to, for example, Japanese Patent Application Laid-Open No. 2004-186004: Paragraphs [0035] to [0037] and FIG. 2 therein).

However, in the case of the spread illuminating apparatus of FIG. 4, it is difficult to completely eliminate the heat deformation problem with the light inlet surface of the light conductor plate making contact with the LED only by making the LED contact with the metallic chassis for enhancing the radiation performance as described above. As for the prevention of the heat deformation, it is preferable for the LED not to make contact with the light conductor plate. On the other hand, when the LED is disposed at the light inlet surface of the light conductor plate with an air gap provided therebetween, variation in gap size causes variation in brightness and visual quality.

SUMMARY OF THE INVENTION

The present invention has been made in light of the above problems, and it is an object of the present invention to provide a spread illuminating apparatus in which a point light source is disposed at a light inlet surface of a light conductor plate such that a predetermined gap is provided and maintained consistent therebetween thereby stably retaining an optical coupling therebetween.

In order to achieve the object described above, according to the present invention, there is provided a spread illuminating apparatus 10 (30) which includes: at least one point light source 12; a light conductor plate 14 (34) having an end surface including at least one light inlet face 14a (34a) opposing the point light source 12; and a housing frame to hold the point light source 12 and the light conductor plate 14 (34). In the spread illuminating apparatus 10 (30) described above, the housing frame includes an inner frame member 16 and an outer frame member 18 having a first end wall 18a (18f) and adapted to enclose the inner frame member 16; the point light source 12 is disposed at the first end wall 18a (18f) of the outer frame member 18; the light conductor plate 14 (34) and the inner frame member 16 are jointed to each other via two first joint means 31 and 32 (41 and 42) thereby constituting a subassembly 20 (40) which has, at its one end, interface surfaces 17 (35a) to make contact with the first end wall 18a (18f) of the outer frame member 18; the light inlet face 14a (34a) of the light conductor plate 14 (34) recedes from the interface surface 17 (35a) of the subassembly 20 (40) by a predetermined dimension $l_1$ ($l_2$); each of the two first joint means 31 and 32 (41 and 42) includes an elastic member 25/26 to press the light conductor plate 14 (34) toward the interface surfaces 17 (35a) of the subassembly 20 (40); and the subassembly 20 (40) is jointed to the outer frame member 18 via two second joint means each of which comprises an elastic member 27/28 (25/26) to press the interface surfaces 17 (35a) of the subassembly 20 (40) toward the first end wall 18a (18f) of the outer frame member 18.

Since the point light source is disposed at the first end wall of the outer frame member, the subassembly which is composed of the light conductor plate and the inner frame member has, at its one end, the interface surfaces to make contact with the first end wall of the outer frame member, and since the light inlet face of the light conductor plate is disposed to recede from the interface surfaces of the subassembly by the predetermined dimension, the point light source is adapted to oppose the light inlet face of the light conductor plate with a predetermined gap dimension therebetween, which is determined by the predetermined dimension and also by a height dimension of the point light source measuring from the first end wall.

Also, since the light conductor plate is jointed to the inner frame member via first joint means which each include an elastic member to press the light conductor plate toward the interface surfaces of the subassembly, and since the subassembly thus composed of the light conductor plate and the inner frame member is jointed to the outer frame member via second joint means which each include an elastic member to press the interface surfaces toward the first end wall of the outer frame member, the predetermined gap dimension provided between the point light source and the light inlet face of the light conductor plate can be held constant, whereby an optical coupling between the point light source and the light conductor plate can be stably maintained.

In the present invention, the light conductor plate 14 (34) may include two side surfaces 14b and 14c (34b and 34c) oriented substantially orthogonal to the light inlet face 14a (34a), the inner frame member 16 may include two side bars 16b and 16c opposing respectively the two side surfaces 14b and 14c (34b and 34c) of the light conductor plate 14 (34), and each of the two first joint means 31 and 32 (41 and 42) may further conclude a side projection 23/24 (43/44) formed at each of the two side surfaces 14b and 14c (34b and 34c) of the light conductor plate 14/34, and a recess 21/22 formed at each of the two side bars 16b and 16c of the inner frame member 16 so as to lodge the side projection 23/24 and the elastic member 25/26, such that a face (stopper face) 23a/24a of the side projection 23/24 facing toward the interface surface 17 (35a) of the subassembly 20 (40) makes contact with a surface of the recess 21/22, and such that a face of the side projection 23/24 located opposite to the stopper face 23a/24a makes contact with the elastic member 25/26.

According to one aspect of the present invention, the outer frame member 18 may further include a second end wall 18b disposed at an opposite end to the first end wall 18a; the interface surfaces 17 of the subassembly 20 may be constituted by open end faces of the two side bars 16b and 16c of the inner frame member 16 and make contact with the first end wall 18a; and the elastic members 27 and 28 constituting the two second joint means may be disposed between the second end wall 18b of the outer frame member 18 and an end bar 16d of the inner frame member 16 facing the second end wall 18b.

In the one aspect of the present invention, the stopper face 23a/24a of the side projection 23/24 facing toward the interface surface 17 of the subassembly 20 may either align with or align close to the light inlet face 14a of the light conductor plate 14 in a position defined with respect to a direction orthogonal to the light inlet face 14a of the light conductor plate 14.

Since the point light source is disposed at the first end wall of the outer frame member, and since the interface surfaces of the subassembly to make contact with the first end wall are constituted by the open end faces of the side bars of the inner frame member, the predetermined dimension from the interface surfaces of the subassembly to the light inlet face of the light conductor plate positioned to recede from the interface surfaces of the subassembly is to be determined by the predetermined dimension measuring from the open end face of the side bar of the inner frame member to the stopper face of the side projection facing toward the interface surface of the subassembly and also by a distance t measuring from the plane of the stopper face to the plane of the light inlet face of the light conductor plate, and the predetermined gap dimension is determined by the predetermined dimension and the height dimension of the point light source.

With this structure, since the predetermined gap dimension can be ensured without allowing the end surface of the light conductor plate having the light inlet face to make contact with the first end wall of the outer frame member, and also without using any spacer members in contact with the end surface of the light conductor and the first end wall of the outer frame member, heat generated at the point light source can be suppressed from transmitting to the end surface of the light conductor plate.

Also, since the contact between the stopper face of the side projection of the light conductor plate and an inner surface of the recess of the inner frame member is duly maintained by a force generated by the elastic member of the first joint means, the light conductor plate can be fixedly positioned with respect to the inner frame member, and since the contact between the open end faces of the side bars of the inner frame member and the first end wall of the outer frame member is duly maintained by the elastic member constituting the second joint means, the predetermined gap dimension can be maintained constant.

Further, since the datum plane of the light conductor plate defined with respect to its expansion and contraction due to the temperature or humidity change in the direction orthogonal to the light inlet face aligns substantially with a virtual plane P defined by connecting the stopper faces of the side projections of the light conductor plate, if the stopper face of the projection is arranged to align with or close to the light inlet face of the light conductor plate in a position with respect to the direction orthogonal to the light inlet face, the variation in the position of the light inlet face due to the expansion and contraction of the light conductor plate and also the variation in the predetermined gap dimension can be minimized.

According to another aspect of the present invention, the outer frame member 18 may further include a second end wall 18b disposed at an opposite end to the first end wall 18f; the end surface of the light conductor plate 34 having the light inlet face 14a may include face areas 35a of projections 35 protruding integrally from the light conductor plate 34 so as to provide the predetermined dimension $l_2$ from the face areas 35a to the light inlet face 14a; the interface surfaces 35a of the subassembly 40 are constituted by the face areas 35a of the projections 35 and make contact with the first end wall 18f; an outer surface 19 of an end bar 16d of the inner frame member 16 makes contact with the second end wall 18b; and the elastic members 25 and 26 of the two first joint means 41 and 42 function also as respective two second joint means.

Since the point light source is disposed at the first end wall of the outer frame member, and since the projections protruding by the predetermined dimension from the light inlet face are integrally formed at the light conductor plate such that the interface surfaces of the subassembly constituted by the face areas of the projections make contact with the first end wall of the outer frame member, the predetermined dimension from the interface surfaces of the subassembly to the light inlet face of the light conductor plate positioned to recede from the interface surfaces of the subassembly is to be determined by the protrusion dimension from the light inlet face, and a predetermined gap dimension is determined by the predetermined dimension and the height dimension $h_2$.

If the outer surface of the end bar of the inner frame member is arranged to make contact with the second end wall of the outer frame member, the contact between the interface surfaces (namely, the face areas of the projections formed integrally with the light conductor plate) of the subassembly and the first end wall of the outer frame member is maintained by a force coming from the elastic member of the first joint member which serves also as the second joint member, and consequently the predetermined gap dimension between the point light source and the light inlet face of the light conductor plate can be maintained constant.

With this structure, since the second joint means can be constituted without requirement of any other elastic members than those included in the first joint means, a spread illuminating apparatus can be provided more easily and less expensively, in which the predetermined gap dimension can be ensured without using any spacer members in contact with the end surface of the light conductor plate having the light inlet face and the first end wall of the outer frame member having the point light source disposed thereon.

Further, since the datum plane of the light conductor plate defined with respect to its expansion and contraction in the direction orthogonal to the light inlet face is constituted by the face areas of the projections making contact with the first end wall of the outer frame member, the datum plane is positioned to align close to the light inlet face of the light conductor plate regardless of the position of the first joint means, and consequently the variation in the position of the light inlet face due to the expansion and contraction of the light conductor plate and also the variation in the predetermined gap dimension can be minimized.

And, in the above-described aspects of the present invention, the outer frame member 18 may be preferably made of a metallic material. Generally, a metallic material is dimensionally more stable under environmental changes, such as temperature and humidity change than a synthetic resin material thus making a suitable material for the outer frame member for the spread illuminating apparatus according to the present invention. Also, a metallic material is favorable in that heat generated by the point light source disposed on the end wall of the outer frame member can be efficiently radiated due to the high heat conductance.

DETAILED DESCRIPTION OF THE INVENTION

Exemplary embodiments of the present invention will be described with reference to the accompanying drawings. It is noted that the drawings do not necessarily reflect the actual configuration and dimension correctly.

Figure 1A:
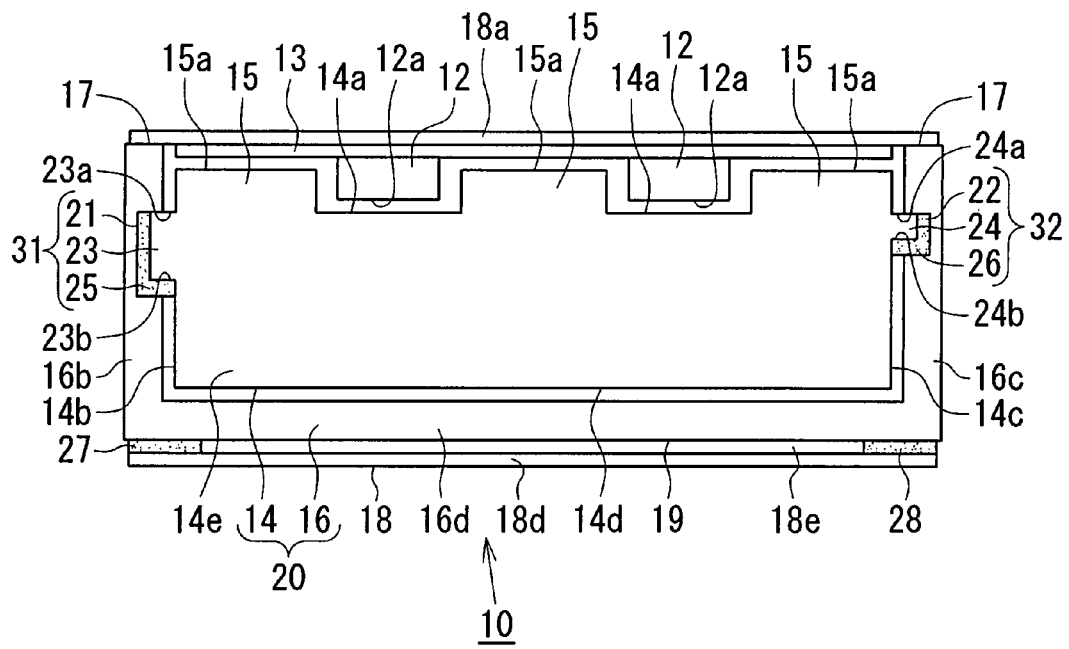
FIG. 1A is a top plan view of a spread illuminating apparatus according to a first embodiment of the present invention.
Figure 1B:
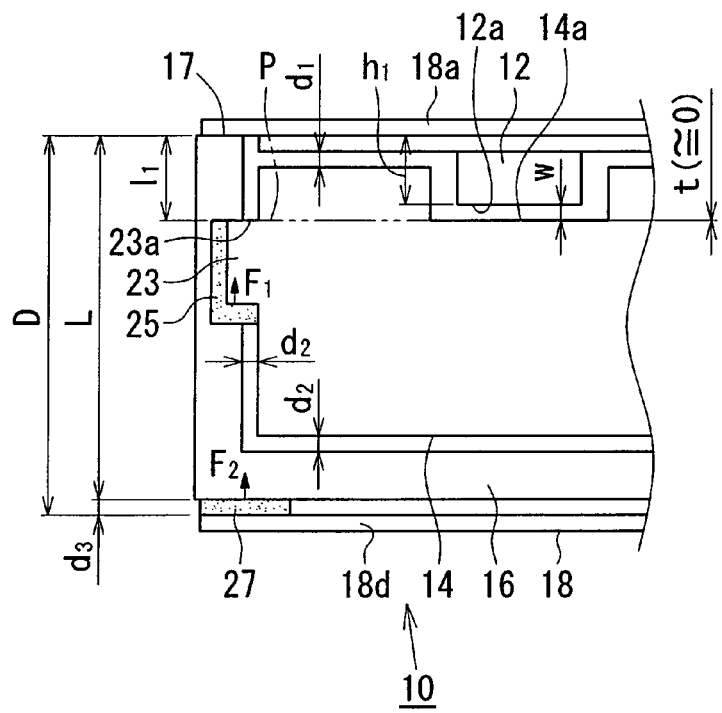
FIG. 1B is an enlarged view of a relevant portion of FIG. 1A.

Referring to FIGS. 1A and 1B, a spread illuminating apparatus 10 according to a first embodiment of the present invention generally includes point light sources 12, a light conductor plate 14, and a double-structured housing frame which houses the point light sources 12 and the light conductor plate 14, and which includes an inner frame member 16 and an outer frame member 18 enclosing the inner frame member 16.

The inner frame member 16 is made of white resin, for example, polycarbonate resin containing titanium oxide as a white pigment, and is formed in a U shape with three bars, specifically, two side bars 16b and 16c (right and left in FIG. 1A) disposed to oppose each other in parallel, and one end bar (rear end bar) 16d (lower in FIG. 1A) disposed at the rear end and bridging respective one ends of the two side bars 16b and 16c while no bar is provided at the front end (upper in FIG. 1A) thus defining an open end. The outer frame member 18 is made of a highly heat conductive metal material, for example, aluminum, formed in a quadrangular shape, and includes a quadrangular plane 18e and first and second end walls 18a and 18d (hereinafter referred to as "front and rear end walls", respectively, as appropriate) substantially vertical to the quadrangular plane 18e and disposed in parallel at respective ends opposite to each other with a separation distance (D) therebetween, which is larger than an overall length (L) of the side bars 16b and 16c of the inner frame member 16. The frame member 18 may be structured into a substantially square U shape in side cross section, for example, such that the front and rear end walls 18a and 18d are formed by pressing a quadrangular flat metal plate.

In the spread illuminating apparatus 10, the point light sources 12 typically constituted by a white LED are arranged at the front end wall 18a of the outer frame member 18. Though the present invention is not limited to any specific arrangement of the point light sources 12, in the first embodiment shown in FIGS. 1A and 1B, the point light sources 12 are each mounted on a circuit board 13 preferably constituted by a flexible printed circuit board, such that a face of the point light source 12 opposite to a light emitting face 12a is attached to the circuit board 13, and the circuit board 13 may be fixedly attached to the front end wall 18a by a fixing means (not shown), such as a heat conductive adhesive tape. With this structure, the outer frame member 18, which is made of metallic material, functions effectively also as a radiator of the heat generated at the point light sources 12.

The light conductor plate 14 is made of transparent resin, for example, acrylic resin, and polycarbonate resin, and is housed in the inner frame member 16 such that two side surfaces 14b and 14c and a rear end surface 14d of the light conductor plate 14 oppose respectively the two side bars 16b and 16c and the rear end bar 16d of the inner frame member 16, wherein the light conductor plate 14 and the inner frame member 16 are combined and structured into a subassembly 20 such that the side surfaces 14b and 14c are jointed to the side bars 16b and 16c by a pair of first joint means 31 and 32 (to be described hereinafter), respectively. In the following description, the open end of the subassembly 20 at which the inner frame member 16 has no bar is referred to as "front end of the subassembly 20" as appropriate.

The first joint means 31/32 is composed of a side projection 23/24 formed at the side surface 14b/14c of the light conductor plate 14, a recess 21/22 formed at the side bar 16b/16c of the inner frame member 16, and an elastic member 25/26. The recess 21/22 defines a slightly larger open space respectively than the side projection 23/24, and lodges the side projection 23/24 together with the elastic member 25/26. The side projection 23/24 and the elastic member 25/26 are lodged in the recess 21/22 such that a front face (hereinafter referred to as "stopper face" as appropriate) 23a/24a of the side projection 23/24 facing toward the front end of the subassembly 20 makes contact with a face of the recess 21/22 located toward the front end, and the remaining faces of the side projection 23/24 including a rear face 23b/24b opposite to the stopper face 23a/24a make contact with the elastic member 25/26. The light conductor plate 14, when jointed to the inner frame member 16 as described above, is pressed toward the front side of the subassembly 20 by a force ($F_1$) generated by the elastic members 25 and 26.

The light conductor plate 14 has, at a front end surface thereof located toward the front end of the subassembly 20, light inlet faces 14a opposing the respective point light sources 12. The other areas of the front end surface of the light conductor plate 14 than the light inlet faces 14a integrally protrude relative to the light inlet faces 14a so as to form front projections 15 having respective face areas (projected front faces) 15a. The above-described side surfaces 14b and 14c of the light conductor plate 14 are oriented substantially orthogonal to the front end surface of the light conductor plate 14, that is say, orthogonal to the light inlet faces 14a and the projected front faces 15a.

The light inlet faces 14a and the projected front faces 15a of the light conductor plate 14 are positioned rearward (lower in FIG. 1A) of open end faces (front end faces) 17 of the side bars 16b and 16c of the inner frame member 16. The subassembly 20 structured as described above is disposed between the front and rear end walls 18a and 18d of the outer frame member 18 such that the front end faces 17 of the inner frame member 16 make contact with the front end wall 18a thus defining the front end faces 17 as "interface surfaces" for the subassembly 20 (hereinafter the open/front end face 17 is referred to as "interface surface" as appropriate in the description of the first embodiment), and such that the rear end bar 16d of the inner frame member 16 joints to the outer frame member 18 via a pair of second joint means (to be described below).

The pair of second joint means are constituted by elastic members 27 and 28, respectively, disposed between the rear end bar 16d of the inner frame member 16 and the rear end wall 18d of the outer frame member 18, and generate a force ($F_2$) to press the subassembly 20 toward the front end wall 18a so as to bring the front end faces 17 of the inner frame member 16 into a firm contact with the front end wall 18a of the outer frame member 18, thus jointing the subassembly 20 to the outer frame member 18.

Description will be further made on the structure of the spread illuminating apparatus 10 and also on the operation and advantage thereof.

In the spread illuminating apparatus 10, lights emitted from the point light sources 12 are introduced into the light conductor plate 14 from the light inlet faces 14a, transmitted through the light conductor plate 14, and exit out from a major surface 14e (light outlet surface) in a uniform manner. The distance between the plane of the interface surface 17 of the subassembly 20 and the plane of the light inlet face 14a is determined by a dimension ($l_1$) measuring from the interface surface 17 to the stopper face 23a/24a of the side projection 23/24 and a distance (t) measuring from the stopper face 23a/24a to the plane of the light inlet face 14a (in the embodiment shown in FIG. 1A, the light inlet faces 14 coincide with a virtual plane (P) defined by connecting the stopper faces 23a and 24a, thus reducing the distance (t) to substantially zero).

Consequently, the plane of the light inlet face 14a of the light conductor plate 14 is to be positioned rearward of the plane of the interface surface 17 of the subassembly 20 by a dimension obtained by subtracting the distance (t) from the dimension ($l_1$) in case of the light inlet face 14a positioned forward of the stopper face 23a/24a, or by adding the distance (t) to the dimension ($l_1$) in case of the light inlet face 14a positioned rearward of the stopper face 23a/24a. In the spread illuminating apparatus 10 in which the interface surface 17 of the subassembly 20 is adapted to make contact with the front end wall 18a of the outer frame member 18, if the subassembly 20 is designed such that the dimension thus obtained by the dimension ($l_1$) and the distance (t) is set to be larger by a predetermined gap dimension (w) than a height dimension ($h_1$) measuring from the front end wall 18a to the light emitting face 12a, then a clearance corresponding to the predetermined gap dimension (w) is formed between the light emitting face 12a of the point light source 12 and the light inlet face 14a of the light conductor plate 14.

Under the circumstances described above, the stopper face 23a/24a of the side projection 23/24 of the light conductor plate 14 is kept in firm contact with the frontward located face of the recess 21/22 of the inner frame member 16 thanks to the force ($F_1$) produced by the elastic member 25/26 of the first joint means 31/32, whereby the light conductor plate 14 is fixedly positioned with respect to the inner frame member 16, and at the same time the front end surface 17 of the side bar 16b/16c of the inner frame member 16, that is to say the interface surface 17 of the subassembly 20, is kept in firm contact with the front end wall 18a of the outer frame member 18 thanks to the force ($F_2$) produced by the second joint means constituted by the elastic member 27/28, whereby the predetermined gap dimension (w) is consistently ensured between the light emitting face 12a of the point light source 12 and the light inlet face 14a of the light conductor plate 14.

Also, the first joint means 31 and 32, which respectively joint the side surfaces 14b and 14c of the light conductor plate 14 to the side bars 16b and 16c of the inner frame member 16 via the elastic members 25 and 26, may be so structured that the light conductor plate 14 can be fixedly positioned with respect to the inner frame member 16 as predetermined, and at the same time a clearance ($d_1$), which is necessary and sufficient in consideration of the light conductor plate 14 expanding, for example, due to the temperature and moisture change, can be provided between the projected front face 15a of the light conductor plate 14 and the front end wall 18a (or the circuit board 13 if provided thereon).

The structure described above consistently ensures provision of the predetermined gap dimension (w) between the light emitting face 12a of the point light source 12 and the light inlet face 14a of the light conductor plate 14 without allowing the projected front face 15a of the light conductor plate 14 to get in contact with the front end wall 18a of the outer frame member 18 (or with the circuit board 13), or without providing any other spacer members in contact with the light conductor plate 14 and the front end wall 18a of the outer frame member 18 (or the circuit board 13), thus suppressing heat generated at the point light source 12 from transmitting to the light inlet face 14a and the projected front face 15a of the light conductor plate 14. Also, with this structure, the projected front face 15a is kept from touching the circuit board 13 thus preventing damages on the circuit board 13, such as wire breakage.

In the structure, it is preferred that a clearance ($d_2$), which is determined necessary and sufficient by considering the difference in the thermal expansion/contraction amounts of the light conductor plate 14 and the inner frame member 16 based on the properties (linear expansion coefficient, and the like) of their materials and on their dimensions in respective expanding directions, is provided between the surface 14b/14c/14d of the light conductor plate 14 and the bar 16b/16c/16d of the inner frame member 16. In an example case where the light conductor plate 14 with a longitudinal dimension of 200 mm (this dimension is approximately equivalent to the longitudinal dimension of a light conductor plate in a spread illuminating apparatus for use with a 9 inch screen) and the inner frame member 16 are made of polycarbonate, the present inventers found out that considering the expansion amount of the light conductor plate 14 due to moisture absorption, 0.363 mm in each expanding direction is appropriate as the clearance ($d_2$) under a temperature difference of 60 degrees C.

Based on the design concept described above, the clearance ($d_2$) is to be provided also between the surface of the side projection 23/24 and the surface of the recess 21/22 at the first joint means 31/32, and the thickness of the elastic member 25/26 of the first joint means 31/32 is determined according to the dimension of the clearance ($d_2$) and the material properties of the elastic member 25/26 so that the variation of the clearance ($d_2$) due to the expansion and contraction of the light conductor plate 14 and the inner frame member 16 can be elastically absorbed by the elastic member 25/26, and also that the force ($F_1$) can be maintained appropriate.

For example, the study by the present inventors shows that, when the elastic member 25/26 is formed of a common rubber having a hardness degree of 40, with the assembly workability of the spread illuminating apparatus 10 taken into consideration, it is appropriate to set the thickness of the elastic member 25/26 at about 1.5 mm in the case of the clearance ($d_2$) set at 0.363 mm.

Also, a clearance ($d_3$) provided between the rear end wall 18d of the outer frame member 18 and the rear end bar 16d of the inner frame member 16 is determined based on the above-described design concept in consideration of the difference in the expansion/contraction amounts of the outer frame member 18 and the inner frame member 16, and the thickness of the elastic member 27/28 as the second joint means is determined in consideration of the clearance ($d_3$) and also the variation of the clearance ($d_3$) to thereby maintain the force ($F_2$) appropriate.

In this connection, the elastic member 25/26 of the first joint means 31/32 and the elastic member 27/28 as the second joint means is preferably made of a rubber material in terms of component cost but may be made of, for example, an elastomer resin or spring, or may alternatively be structured integrally with the inner frame member 16 or the outer frame member 18 employing any suitable material, insofar as the forces ($F_1$, $F_2$) are appropriately generated.

In the case of the spread illuminating apparatus 10, since the light conductor plate 14 is held within the inner frame member 16 such that the stopper faces 23a and 24a of the side projections 23 and 24 are firmly pressed against the frontward located faces of the recesses 21 and 22, when the light conductor plate 14 is caused to expand or contract due to the temperature or humidity change as described above, the datum plane of the light conductor plate 14 with respect to the expansion and contraction in the direction orthogonal to the light inlet faces 14a agrees substantially with the virtual plane (P) defined by connecting the stopper faces 23a and 24a of the side projections 23 and 24. Accordingly, if the position of the stopper faces 23a and 24a with respect to the direction orthogonal to the light inlet faces 14a is arranged to align with or close to the position of the light inlet faces 14a, the light inlet faces 14a are adapted to align with or close to the virtual plane (P), and therefore the positional change of the light inlet faces 14a due to the expansion or contraction of the light conductor plate 14 and also the change of the predetermined gap dimension (W) can be minimized.

Thus, it is preferable that the stopper faces 23a and 24a of the side projections 23 and 24 be positioned to align with or close to the light inlet faces 14a of the light conductor plate 14 with respect to the direction orthogonal to the light inlet faces 14a as in the spread illuminating apparatus 10 of FIG. 1. However, it is conventionally known that when the light conductor plate 14 has a configuration like the side projection 23/24 added to the side surface 14b/14c, various problems are possibly caused such that the side projection 23/24 constitutes a bright spot, light loss is incurred, difficulty arises with the moldability for injection molding the light conductor plate 14, and the like, depending on the position of the projected configuration. Accordingly, the side projections 23 and 24 are to be appropriately positioned in view of suppressing or preventing the occurrence of such problems and in consideration of the effectiveness in reducing the change of the predetermined gap dimension (w).

Also, in the spread illuminating apparatus 10 of FIG. 1, the front projections 15 are formed to protrude relative to the light inlet faces 14a of the light conductor plate 14, and this structure is advantageous in effectively introducing the lights from the point light sources 12 into the light conductor plate 14 without light leakage, but the present invention is not limited to such a structure and can be duly carried out without the front projections 15, for example such that the face areas corresponding to the projected front faces 15a are flush with the light inlet faces 14a.

A second embodiment of the present invention will be described with reference to FIGS. 2A and 2B. In explaining the example of FIGS. 2A and 2B, any component parts corresponding to those in FIGS. 1A and 1B are denoted by the same reference numerals, and description will be focused on the difference from the first embodiment with redundant detailed explanations omitted below as appropriate.

Figure 2A:
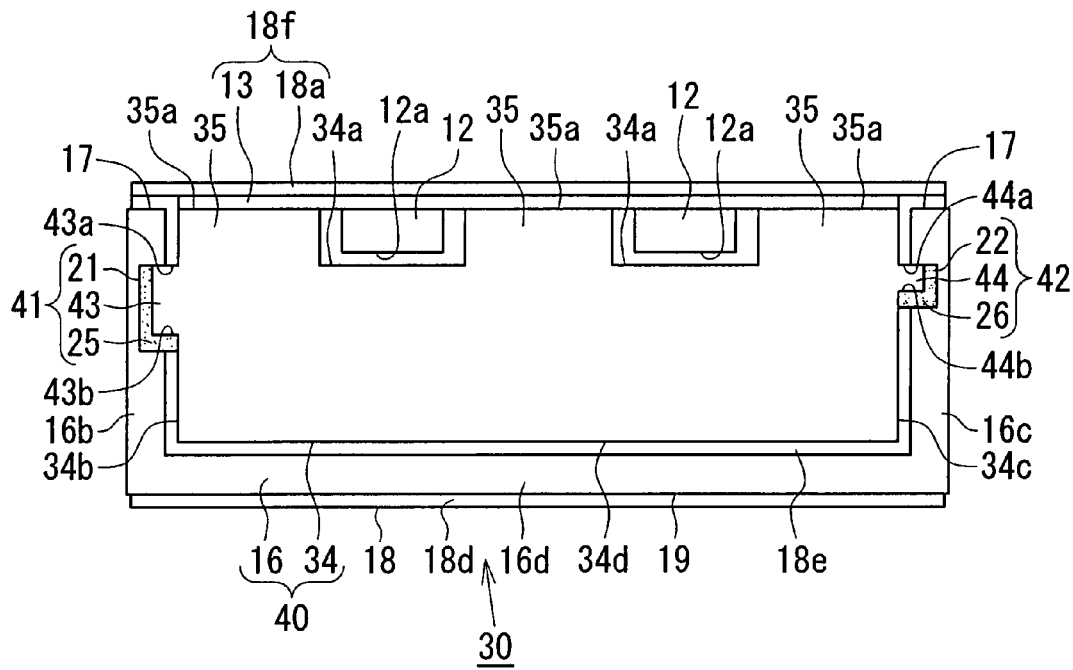
FIG. 2A is a top plan view of a spread illuminating apparatus according to a second embodiment of the present invention.
Figure 2B:
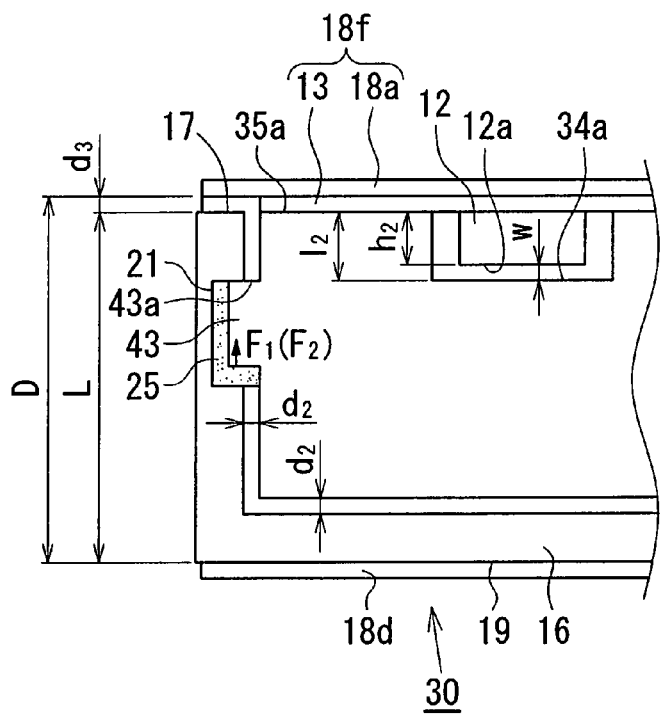
FIG. 2B is an enlarged view of a relevant portion of FIG. 2A.

Referring to FIGS. 2A and 2B, a spread illuminating apparatus 30 according to the second embodiment also includes point light sources 12, a light conductor plate 34, and a double-structured housing frame which houses the point light sources 12 and the light conductor plate 34, and which includes an inner frame member 16 and an outer frame member 18 enclosing the inner frame member 16.

The inner frame member 16 and the outer frame member 18 of the second embodiment are structured identically with those of the spread illuminating apparatus 10 according to the first embodiment described above, and also the point light sources 12 are mounted on a circuit board 13 attached to a first (front) end wall 18a of the outer frame member 18. While a subassembly 40 is constituted by the light conductor plate 34 and the inner frame member 16 which are jointed to each other via first joint means 41 and 42 structured identically with the first joint means 31 and 32 of the spread illuminating apparatus 10, the spread illuminating apparatus 30 differs from the spread illuminating apparatus 10 in the structure of the subassembly 40 and the arrangement of the subassembly 40 with respect to the outer frame member 18 as follows.

In the illuminating apparatus 30, the light conductor plate 34 integrally includes front projections 35 having projected front faces 35a to protrude forward (upper in the figure) with respect to light inlet faces 34a by a dimension ($l_2$) predetermined, and the subassembly 40 is disposed in the outer frame member 18 such that the projected front faces 35a of the light conductor plate 34 make contact with the front end wall 18a of the outer frame member 18 thus defining the projected front face 35a as "interface surface" for the subassembly 40 (hereinafter the projected front face 35a is referred to as "interface surface" for the subassembly 40 as appropriate in the description of the second embodiment). When the circuit board 13 is disposed at the front end wall 18a of the outer frame member 18 as shown in FIGS. 2A and 2B, the interface surfaces 35a of the subassembly 40 make contact with the front end wall 18a of the outer frame member 18 indirectly via the circuit board 13, but the present invention is not limited to such a contact mode and may include a structure where the circuit board 13 is not present at least at portions of the front end wall 18a corresponding to the interface surfaces 35a, and the interface surfaces 35a of the subassembly 40 make a direct contact with the front end wall 18a of the outer frame member 18. In the following description, the expression "the contact surfaces 35a of the subassembly 40 make contact with the front end wall of the outer frame member 18"

is used regardless of the contact mode, specifically the direct or the indirect contacts via the circuit board 13, where the front end wall combined with the circuit board 13 is numbered with a reference numeral "18f" in case of the indirect contact.

In the second embodiment, the subassembly 40 is disposed inside the outer frame member 18 such that the interface surfaces 35a make contact with the front end wall 18f, and that an end surface 19 of an end bar 16d of the inner frame member 16 makes contact with a second end wall (rear end wall) 18d of the outer frame member 18. With this structure, a clearance ($d_3$), which is equivalent to the dimensional difference between a separation distance (D) from the front end wall 18a to the rear end wall 18d and an overall length (L) of a side bar 16b/16c of the inner frame member 16, is provided toward an open end face (front end face) 17 of the side bar 16b/16c.

An elastic member 25/26 of the first joint means 41/42 generates a force ($F_1$) which acts so as to press the light conductor plate 34 toward the front end of the subassembly 40, and at the same time which functions as a force ($F_2$) to press the interface surfaces 35a against or toward the front end wall 18a of the outer frame member 18 so as to maintain the contact therebetween. That is to say, the elastic member 25/26 is a constituent member of the first joint means 41/42, and at the same time functions as a second joint means which, like the second joint means 27/28 of the spread illuminating apparatus 10, joints the subassembly 40 to the outer frame member 18.

In the spread illuminating apparatus 30 structured such that the interface surfaces 35a of the subassembly 40 (namely, the projected front faces of the light conductor plate 34) make contact with the front end wall 18f of the outer frame member 18, the light inlet face 34a of the light conductor plate 34 is located rearward of the interface surface 35a of the subassembly 40 by the dimension ($l_2$) predeterminedly defined by the protruding length of the projection 35, and if the dimension ($l_2$) is set to be larger by a predetermined gap dimension (w) than a height dimension ($h_2$) of the point light source 12 measuring from the front wall end 18f, then the predetermined gap dimension (w) is provided as clearance between a light emitting face 12a of the point light source 12 and the light inlet face 34a of the light conductor plate 34.

In this structure, since the outer surface 19 of the end bar 16d of the inner frame member 16 makes contact with the rear end wall 18d of the outer frame member 18, the contact between the interface surfaces 35a of the subassembly 40 and the front end wall 18f of the outer frame member 18 is surely maintained by the force ($F_2$) coming from the elastic member 25/26 of the first joint means 41/42, which also plays a role of the second joint means as described above, whereby the predetermined gap dimension (w) as a clearance can be duly kept constant. In this connection, unlike the spread illuminating apparatus 10 according to the first embodiment, once the subassembly 40 is jointed to the outer frame member 18, a front face 43a/44a of a side projection 43/44 facing the front end of the subassembly 40 does not necessarily have to be held in firm contact with a face of the recess 21/22 located toward the front end.

According to the second embodiment, the predetermined gap dimension (w) as a clearance can be consistently ensured without requirement of any other elastic member than the elastic member 25/26 of the first joint means 41/42, and without using any additional spacer member making contact with the front end surface of the light conductor plate 34 including the light inlet faces 34 and also with the front end wall 18f of the outer frame member 18 having the point light sources 12 thereon, thus achieving a simpler and less expensive structure for a spread illuminating apparatus.

Also, in this structure, since the datum plane of the light conductor plate 34 defined with respect to the expansion or contraction of the light conductor plate 34 in the direction orthogonal to the light inlet face 34a is located at the interface surface 35a of the subassembly 40 making contact with the front end wall 18f of the outer frame member 18, unlike the first embodiment described above, the datum plane is positioned close to the light inlet face 34a of the light conductor plate 34 regardless of where the first joint means 41/42 is disposed. Consequently, the variation of the position of the light inlet face 34a due to the expansion and contraction of the light conductor plate 34 and furthermore the variation of the predetermined gap dimension (w) can be reduced to the minimum.

Figure 3:
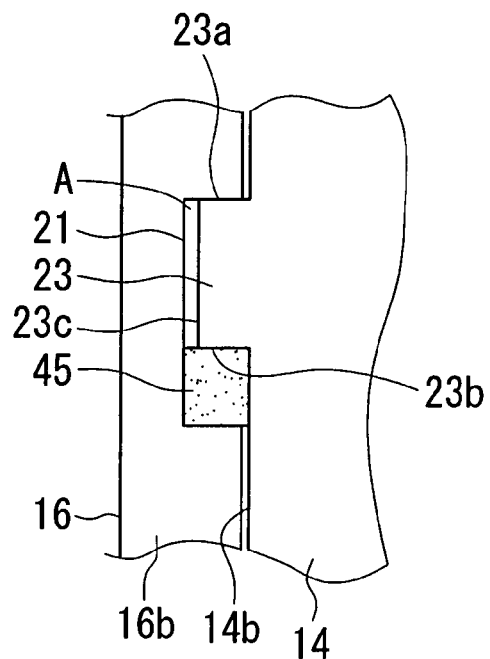
FIG. 3 is a top plan view of a modification of a first joint means in the present invention.
Figure 4:
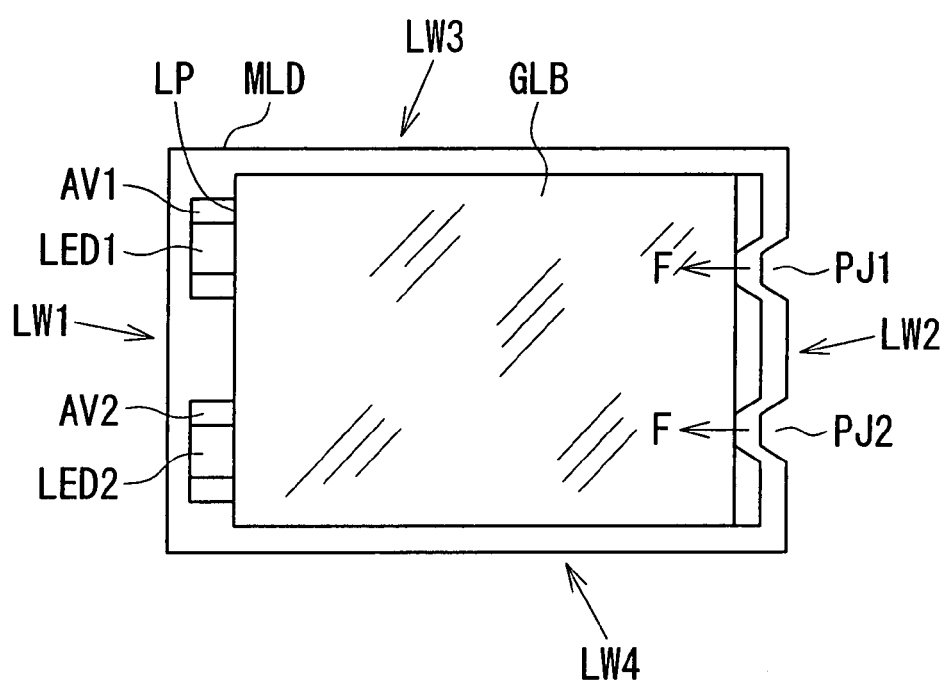
FIG. 4 is a top plan view of a conventional spread illuminating apparatus.

Description has been made on the exemplary embodiments of the present invention, but the present invention is not limited to the embodiments described above. For example, in the spread illuminating apparatus 10 of FIG. 1A, the elastic member 25/26 has an L-shape in top plan view and is completely fitted in the space of the recess 21/22 of the inner frame member 16 defined by the side projection 23/24 of the light conductor plate 14. This structure is favorable in that the expansion and contraction of the light conductor plate 14 in the direction parallel to the light inlet face 14a (horizontal direction in the figure) can be elastically absorbed thereby stably holding the light conductor plate 14 in the inner frame member 16. But the present invention is not limited to the structure described above, and as shown in FIG. 3, an elastic member 45 having a substantially rectangular shape may alternatively be provided such that the space of the recess 21/22 defined by a face (denoted by 23c in FIG. 3) of the side projection 23/24 parallel to the side surface 14b/14c of the light conductor plate 14 is left open as a gap (refer to a portion A in the figure). This alternative structure applies also to the spread illuminating apparatus 30 of FIG. 2A.

And, in FIG. 1A/2A, the first joint means 31/41 shown to the left of the figure is configured differently from the first joint means 32/42 shown to the right of the figure, that is, the projection 23/43 and the recess 21 shown to the left of the figure are configured differently from the projection 24/44 and the recess 22 shown to the right of the figure. This is for the purpose of easily distinguishing the obverse face from the reverse face for the light conductor plate 14/34, for example, in the production process of the spread illuminating apparatus 10/30. But the present invention is not limited to such an asymmetric structure of the first joint means 31/41 and 32/42, and the first joint means 31/41 including the projection 23/43 and the recess 21 may be configured identically with the first joint means 32/42 including the projection 24/44 and the recess 22 in a symmetric manner.

What is claimed is:

1. A spread illuminating apparatus comprising:
   at least one point light source;
   a light conductor plate having an end surface including at least one light inlet face opposing the point light source; and
   a housing frame to hold the point light source and the light conductor plate, wherein: the housing frame comprises an inner frame member, and an outer frame member having a first end wall and adapted to enclose the inner frame member; the point light source is disposed at the first end wall of the outer frame member; the light conductor plate and the inner frame member are jointed to each other via two first joint means thereby constituting a subassembly which has, at its one end, interface surfaces to make contact with the first end wall of the outer frame member; the light inlet face of the light conductor plate recedes from the interface surface of the subassembly by a predetermined dimension; each of the two first joint means comprises an elastic member to press the light conductor plate toward the interface surfaces of the subassembly; and the subassembly is jointed to the outer frame member via two second joint means each of which comprises an elastic member to press the interface surfaces of the subassembly toward the first end wall of the outer frame member.

2. A spread illuminating apparatus according to claim 1, wherein: the light conductor plate comprises two side surfaces oriented substantially orthogonal to the light inlet face; the inner frame member comprises two side bars opposing respectively the two side surfaces of the light conductor plate; and each of the two first joint means further comprises a side projection formed at each of the two side surfaces of the light conductor plate, and a recess formed at each of the two side bars of the inner frame member so as to lodge the side projection and the elastic member, such that a face of the side projection facing toward the interface surface of the subassembly makes contact with a surface of the recess, and such that a face of the side projection opposite to the face thereof facing the interface surface makes contact with the elastic member.

3. A spread illuminating apparatus according to claim 2, wherein: the outer frame member further comprises a second end wall disposed at an opposite end to the first end wall; the interface surfaces of the subassembly are constituted by open end faces of the two side bars of the inner frame member and make contact with the first end wall; and the elastic members constituting the two second joint means are disposed between the second end wall of the outer frame member and an end bar of the inner frame member facing the second end wall.

4. A spread illuminating apparatus according to claim 3, wherein the face of the side projection facing toward the interface surface of the subassembly either aligns with or aligns close to the light inlet face of the light conductor plate in a position defined with respect to a direction orthogonal to the light inlet face of the light conductor plate.

5. A spread illuminating apparatus according to claim 1, wherein: the outer frame member further comprises a second end wall disposed at an opposite end to the first end wall; the end surface of the light conductor plate having the light inlet face comprises face areas of projections protruding integrally from the light conductor plate so as to provide the predetermined dimension from the face areas to the light inlet face; the interface surfaces of the subassembly are constituted by the face areas of the projections and make contact with the first end wall; an outer surface of the end bar of the inner frame member makes contact with the second end wall; and the elastic members of the two first joint means function also as respective two second joint means.

6. A spread illuminating apparatus according to claim 2, wherein: the outer frame member further comprises a second end wall disposed at an opposite end to the first end wall; the end surface of the light conductor plate having the light inlet face comprises face areas of projections protruding integrally from the light conductor plate so as to provide the predetermined dimension from the face areas to the light inlet face; the interface surfaces of the subassembly are constituted by the face areas of the projections and make contact with the first end wall; an outer surface of the end bar of the inner frame member makes contact with the second end wall; and the elastic members of the two first joint means function also as respective two second joint means.

7. A spread illuminating apparatus according to claim 1, wherein the outer frame member is made of a metallic material.

8. A spread illuminating apparatus according to claim 2, wherein the outer frame member is made of a metallic material.

9. A spread illuminating apparatus according to claim 3, wherein the outer frame member is made of a metallic material.

10. A spread illuminating apparatus according to claim 4, wherein the outer frame member is made of a metallic material.

11. A spread illuminating apparatus according to claim 5, wherein the outer frame member is made of a metallic material.

* * * * *